Patented Nov. 9, 1948

2,453,259

UNITED STATES PATENT OFFICE 2,453,259

SULFA PREPARATION FOR ANIMAL MASTITIS

Donald G. Perkins, Chestertown, Md., assignor to E. R. Squibb & Sons, New York, N. Y., a corporation of New York No Drawing. Original application April 8, 1941, Serial No. 387,485. Divided and this application April 23, 1948, Serial No. 22,941

3 Claims. (Cl. 167—51.5)

This application is a division of my application Serial No. 387,485, filed April 8, 1941, now abandoned.

This invention relates to, and has for its object the provision of, preparations for the treatment of animal (especially bovine) mastitis, and a method of treating this disease.

Animal mastitis is a chronic infectious disease of the mammary glands of animals, especially prevalent in dairy cattle, and generally caused by infection with Streptococcus agalactiae. A variety of medicinal agents and methods of treatment have been employed in the treatment of this disease, but the results have been discouraging; and it has been generally agreed that animal mastitis is intractable.

It has been found that animal mastitis may be effectively treated by direct injection of a preparation essentially comprising a medicinal agent for animal mastitis carried by a substantially water-immiscible liquid having a specific gravity less than that of the treated animal's milk. [By "direct injection" is meant infusion into the milked-out, functioning mammary gland.] The direct injection of a suspension of colloidal silver oxide in mineral oil, for example, has been found to be exceptionally effective in the treatment of bovine (streptococcic) mastitis.

It is believed that the effectiveness of the preparations and method of treatment of this invention is due to the particular type of carrier used. Thus, by virtue of its specific gravity, the carrier releases its medicinal agent while passing up through, and riding on, the milk coming down through the mammary gland; and the medicinal agent is thereby dispersed throughout the affected tissues; and this dispersion enables the use of a materially smaller infusion than heretofore employed. It is not intended, however, that the invention be limited by any theoretical explanation.

Any medicinal agent adapted for the treatment of animal mastitis by direct injection (i. e., any animal-mastitis-bactericide) may be used in the preparations of this invention; inter alia, the so-called bactericides (especially streptococcicides), biological products having bactericidal effect (e. g., bacteriophages), and chemotherapeutic agents (especially of the sulfanilamide type). Among the utilizable streptococcicides are the acridine derivatives (e. g., rivanol and acriflavine) and especially colloidal silver oxide. As the carrier, one may use any substantially water-immiscible liquid having a specific gravity less than that of the milk (and, of course, non-reactive with the medicinal agent). Preferably, the carrier is an oil (vegetable, animal, or mineral) having a specific gravity materially less than 1; e. g., olive oil, peanut oil, or liquid petrolatum. Mineral oil is an especially desirable carrier because it is inert and non-irritating to the mammary-gland tissues.

The medicinal agent may be directly embodied in the carrier (i. e., dissolved or suspended therein), or indirectly embodied in the carrier, as by incorporating in the carrier a solution, emulsion, or suspension of the medicinal agent in some other medium. The carrier and/or the finished preparation may be sterilized.

The invention is illustrated by the following specific example describing the production of a suspension of colloidal silver oxide (of extremely small particle size) in mineral oil, and the treatment of bovine mastitis therewith:

A suspension of colloidal silver oxide in mineral oil is prepared in a known manner for obtaining extremely small particle size, e. g., by incorporating finely-divided silver oxide in mineral oil and mechanically reducing the silver oxide particles to colloidal size (as by passing the mixture through a colloid mill and further subjecting it to dispersion in a pebble mill). The suspension should preferably contain about 5% silver oxide.

Milk samples from abnormal quarters of cows are subjected to laboratory culture tests to establish the disease as bovine mastitis and identify the type of organism causing it. The suspected cows are segregated, or at least kept at the end of the milking line. If the quarter is swollen or inflamed, this condition is reduced before starting treatment.

The infected quarter is milked out and stripped, and the outside of the quarter is washed and treated with antiseptic solution. The suspension of colloidal silver oxide in mineral oil is shaken thoroughly to insure complete admixture and (preferably) its temperature is adjusted to substantially body temperature. Ten cc. of the preparation is drawn into a syringe and injected through the teat canal into the infected quarter, any material in the canal being worked up into the milk cistern by holding the end of the teat with the fingers of one hand and pressing upward with the fingers of the other hand. Then the base of the teat is grasped and the entire quarter palpitated upward into itself several times to distribute the preparation in the udder tissue.

The treated quarters are milked out with the others at regular milking time, and the treatment is repeated at least once in 72 hours (cases of long standing may need 3, or even 4, injections, 72 hours apart). After each injection, swelling and tenderness of the treated quarter follows, with a thick, stringy, grayish-green exudate. These symptoms usually subside within 2 or 3 days after each injection. Ten days to two weeks after treatment, milk samples of the cows are again subjected to laboratory culture tests to establish freedom from the disease.

The conditions of the treatment may be varied considerably; thus 2 to 10% suspensions of colloidal silver oxide may be injected 1 to 5 times in quantities of 5 to 20 cc. and at intervals of 12 to 72 hours; but the conditions of the foregoing example are preferred.

The invention may be variously otherwise embodied within the scope of the appended claims.

I claim:

1. A composition for the treatment of bovine mastitis by direct injection consisting of a homogenized mixture of a sulfa drug in liquid petrolatum.

2. A preparation for the treatment of animal mastitis by direct injection essentially comprising a colloidized suspension of a chemotherapeutic agent of the sulfanilamide type in mineral oil.

3. A preparation for the treatment of bovine mastitis by direct injection essentially comprising a colloidized suspension of sulfanilamide in mineral oil.

DONALD G. PERKINS.

REFERENCES CITED

The following references are of record in the file of this patent:

UNITED STATES PATENTS

| Number | Name | Date |
| --- | --- | --- |
| 2,238,973 | Climenko | Apr. 22, 1941 |

OTHER REFERENCES

Sheehan, Medical Record, vol. 152, Sept. 4, 1940, page 166.